K. F. NYSTROM.
TRUCK LOCKING DEVICE.
APPLICATION FILED MAR. 1, 1919.

1,357,796.

Patented Nov. 2, 1920.
3 SHEETS—SHEET 1.

WITNESSES:
Wm. Geiger

INVENTOR.
Karl F. Nystrom
BY George I. Haight
his ATTORNEY

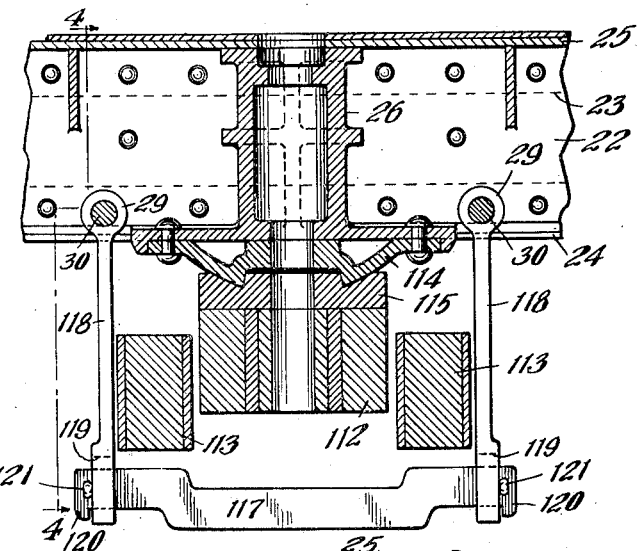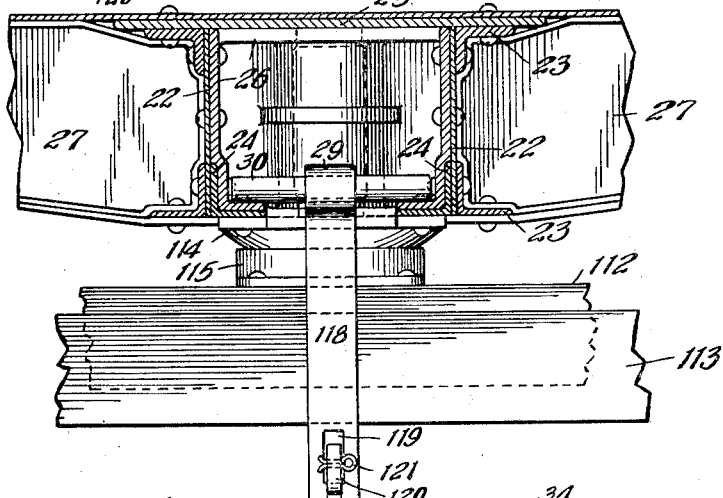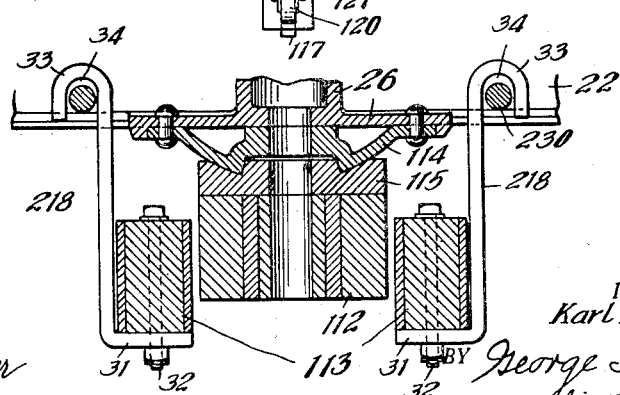

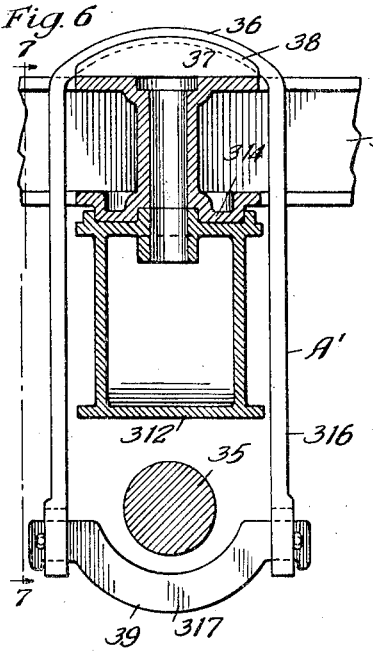
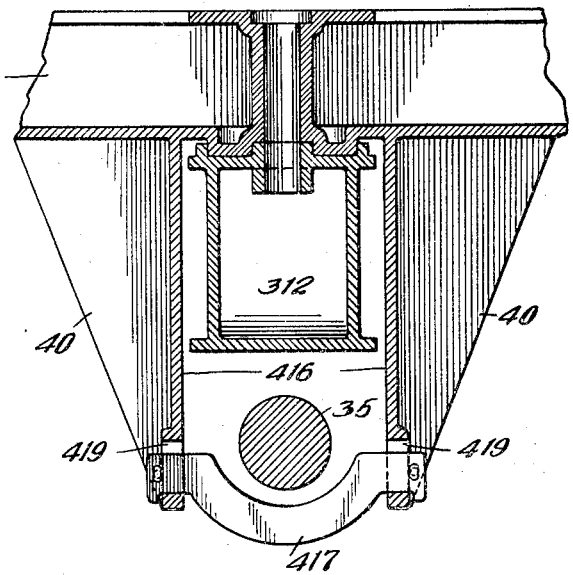
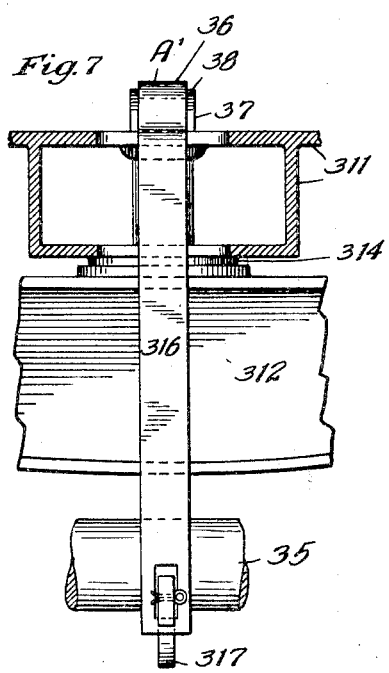
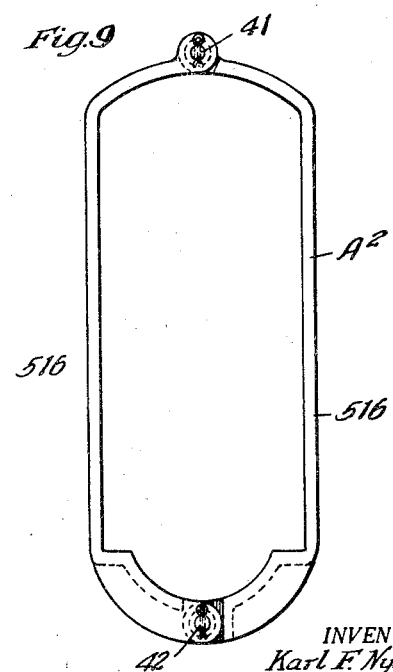

UNITED STATES PATENT OFFICE.

KARL F. NYSTROM, OF MONTREAL, QUEBEC, CANADA.

TRUCK-LOCKING DEVICE.

1,357,796.   Specification of Letters Patent.   Patented Nov. 2, 1920.

Application filed March 1, 1919. Serial No. 280,170.

*To all whom it may concern:*

Be it known that I, KARL F. NYSTROM, a subject of the King of Sweden, residing at Montreal, in the Province of Quebec, Dominion of Canada, have invented a certain new and useful Improvement in Truck-Locking Devices, of which the following is a full, clear, concise, and exact description, reference being had to the accompanying drawings, forming a part of this specification.

This invention relates to improvements in truck locking devices.

For some time past there has been an effort on the part of railroads and safety commissions to provide efficient means for preventing telescoping of cars in wrecks and more particularly to prevent the trucks from being shifted lengthwise of the car. One solution of this problem has been by utilizing a so-called "locking center pin." This pin is so designed that it passes through the body and truck bolsters of the car and when in assembled position has flanges or shoulders overlapping shoulders or flanges of the body and truck bolsters in such a manner that vertical separation of the body and truck bolsters is prevented as is also shifting of the truck bolster relatively to the body bolster. While this construction is effective, its application is limited because of the fact that a large center pin opening in the bolsters is required which is not found in cars of ordinary standard construction. The usual car construction provides only for a center pin of approximately 2" in diameter. There are also other constructions in service which do not permit of a center pin being extended through the truck bolster to permit the flanged or shouldered engagement above referred to.

One object of my invention is to provide simple and efficient means for locking the trucks of cars to the underframe of the car body so as to prevent telescoping of cars and which means may be applied to various standard constructions now in service without modification of the openings for the center pin.

Another object of the invention is to provide truck locking means of the character above indicated which may be readily applied to car constructions after the trucks are assembled with the car bodies.

Other objects of the invention will more fully appear from the description hereinafter following.

Figure 1:
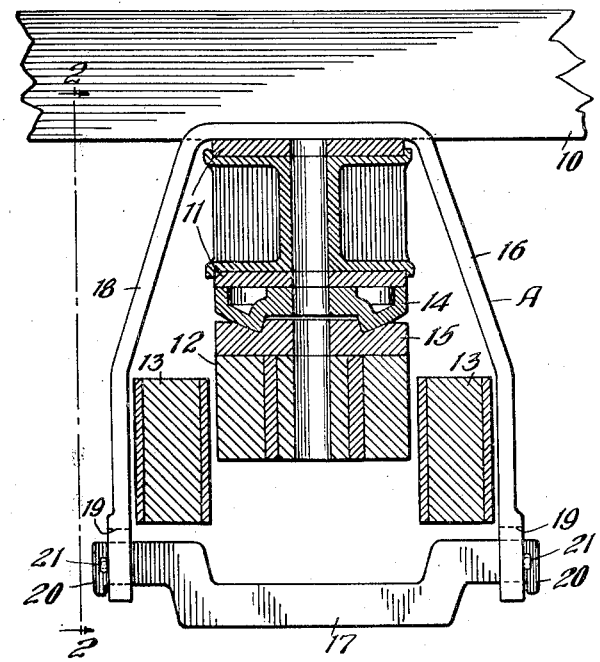
Figure 2:
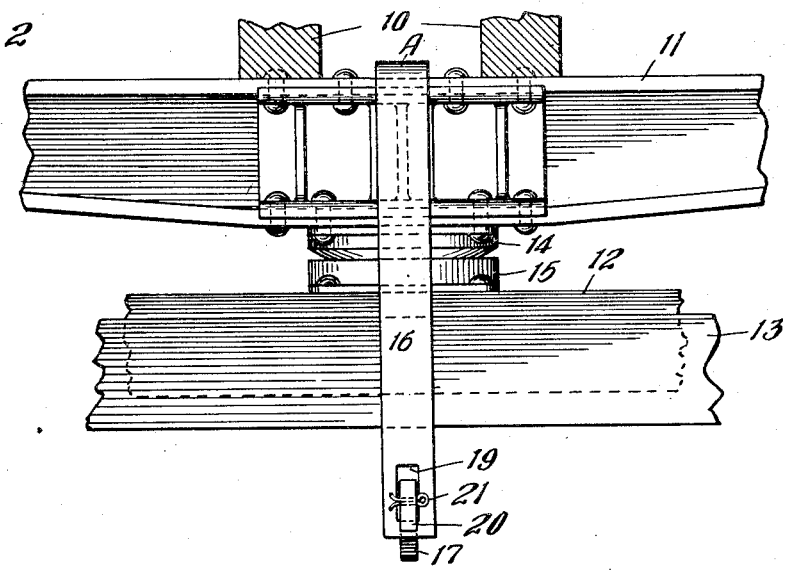

In the drawings forming a part of this specification, Figure 1 is a vertical, sectional view of a portion of a car structure showing one form of my invention as utilized in connection with a four-wheel truck. The section is taken lengthwise of the car at the center pin. Fig. 2 is a view at right angles to that shown in Fig. 1 and corresponding substantially to the line 2—2 of Fig. 1. Fig. 3 is a view similar to Fig. 1 but showing my improvements adapted to a car construction wherein the center sill and body bolster are built up from rolled and pressed plates, the center sill having the usual cover plate. Fig. 4 is a sectional view taken substantially on the line 4—4 of Fig. 3. Fig. 5 is another view similar to Figs. 1 and 3 illustrating another embodiment of my invention. In the construction shown in Figs. 3, 4 and 5, the truck is of that form known as a four-wheel truck. Figs. 6 and 7 are views corresponding respectively to Figs. 1 and 2, Fig. 7 being taken on the line 7—7 of Fig. 6, and illustrating another embodiment of the invention and more particularly as adapted to car constructions employing six-wheel trucks. Fig. 8 is a sectional view similar to Fig. 7 illustrating a still further embodiment of the invention. And Fig. 9 is an elevational view of a modified form of yoke such as may be substituted for that shown in Figs. 6 and 7.

Referring to the construction illustrated in Figs. 1 and 2, 10 denotes one of the center sills of the car, 11 the body bolster, 12 the truck bolster, 13—13 the truck transoms, 14 the upper center bearing plate and 15 the lower center bearing plate, the bearing plates shown being of well known form and the usual provision for an ordinary center pin being made.

To lock the truck and more particularly the truck bolster and transoms to the car under-frame of which, of course, the body bolster forms a part, I employ the improved yoke designated generally by the reference A. Said yoke, as shown, comprises an inverted U-shaped heavy plate 16 and a detachable key 17. Said plate 16 is passed over the top of the body bolster between the two center sills and is then extended downwardly and outwardly for a part of its length as indicated at 18 so as to pass it to the outsides of the truck bolster and transoms. The lower ends of the arms of said plate 16 are slotted as indicated at 19—19 and permit the insertion of the enlarged ends 20—20 of the key 17. After the key 17 is inserted through the slots 19 it drops down under the force of gravity so as to provide shouldered engagement with the straps 16 and in order to prevent accidental removal of the key 17, cotters 21—21 may be employed as clearly shown in Figs. 1 and 2.

From the preceding description taken in connection with the drawings, it will be observed that the yoke clears or is loose with respect to the truck bolster and transoms so as to accommodate the ordinary turning movements of the truck with respect to the car body and also sufficient clearance is provided to permit a limited amount of vertical separation between the center plates, as for instance ½″.

Referring to the construction shown in Figs. 3 and 4, the arrangement of upper center bearing plate 114, lower center bearing plate 115, truck bolster 112 and transoms 113 is the same as shown in Figs. 1 and 2. In the arrangement shown in Figs. 3 and 4, however, the under-frame construction of the car is of that type known as a fabricated under-frame. The center sills are formed by parallelly extending plates 22—22, upper and lower angle irons 23—23 riveted to the outer sides thereof, lower angle irons 24—24 riveted to the inner sides of the plates 22 and an upper cover-plate 25. This forms what is known as a girder or box-like center sill and it is evident that when the rest of the car body is applied thereto, it is impossible to get over the bolster as is possible in the constructions shown in Figs. 1 and 2. The bolster is formed by employing a central bolster casting 26 riveted within the center sill and outer laterally extended pressed bolster plates 27—27. An upper transversely extending tie-plate is also preferably employed.

In order to carry out my invention with a car under-frame structure such as shown in Figs. 3 and 4 and above described, I employ a pair of depending links 118—118 and a lower detachable cross key 117. Each of the links 118 is provided with an eye 29 at its top through which is passed a heavy pin 30. The pins 30 are slipped up between the sides of the box or girder center sill and then turned so as to be at right angles to the center sill in which position the pins 30 will obviously be supported by the lower flanges of the center bolster castings 26 and angles on the interior of the center sill. The links 118 are provided at their lower ends with slots 119 adapted to permit insertion of the enlarged ends 120 of the key 117 the same as in the construction shown in Figs. 1 and 2. The key 117 is held against accidental displacement by suitable cotters 121.

With the construction shown in Figs. 3 and 4, it is evident that the locking device straddles or passes loosely to the sides of the bolster and transoms and the same amount of clearance is used as in the construction shown in Figs. 1 and 2.

Referring to the construction illustrated in Fig. 5, the arrangement of car under-frame, center plates, truck bolster and transoms is the same as shown in Figs. 3 and 4. To provide a locking connection between the car under-frame and the truck, I employ a pair of side arms 218—218 having inwardly extended lower ends 31 which engage under and are bolted to the transoms 213 by the bolts 32. At their upper ends, the side arms 218 are provided with hook-like portions as indicated at 33—33, the same passing over pins or rollers 230 supported by the center sill as will be apparent. In the construction shown in Fig. 5, the clearance to permit vertical movement within normal limits is provided for between the hook-like ends 33 and the pins 230 as indicated by the spaces 34—34. In the constructions shown in Figs. 6, 7 and 8, the under-frame is of that type generally employed on passenger car equipment wherein the body bolster and underframe 311 are cast integrally. The body bolster proper of the combined bolster and underframe 311 also is shown as formed with the upper center bearing plate 314 cast integral. In such passenger car equipment, the trucks are ordinarily provided with six wheels with the axle for the center pair located as indicated at 35, that is, immediately below the truck bolster which is indicated at 312.

In order to lock the truck bolster with the car under-frame in constructions such as shown in Figs. 6 and 7, I employ a yoke A′ which, as shown, consists of an inverted U-shaped member or loop 316 and a removable or detachable bottom key 317. The loop 316 has its upper cross portion 36 bent so as to seat itself on a filler block 37 supported on the car under-frame. The filler block 37 is preferably provided with side flanges 38—38 to confine the upper portion of the loop 316 against movement transversely of the car. The connection beween the loop 316 and the bottom key 317 is the same as in the constructions shown in Figs. 1, 2, 3 and 4 and need not be again described. The key 317 is however preferably provided with a downwardly curved center portion as indicated at 39 in order to fully clear the axle 35.

In the construction shown in Fig. 8, the arrangement of car under-frame including the body bolster, the truck bolster and center axle of the six-wheel truck is the same as shown in Figs. 6 and 7. In the form shown in Fig. 8, however, depending arms 416—416 are cast integral with the bolster and underframe structure, said arms 416 straddling the truck bolster with the necessary clearance to permit relative movement between the bolsters. The arms 416 are suitably braced as by flanges 40—40. At their lower ends, the arms 416 are slotted as indicated at 419 in order to accommodate the ends of the locking key 417 which is inserted and held in the same manner as the keys 17, 117 and 317, previously described.

In Fig. 9 a loop $A^2$ is formed of two elements 516—516 which are pivotally connected at their upper ends as indicated at 41 and are adapted to be detachably connected at their lower ends by a suitable pin as indicated at 42. The loop $A^2$ can be readily substituted for the form of loop $A'$ shown in Figs. 6 and 7, and it is evident that the loops formed of two parts similarly connected may be made of the proper shape to be employed in car constructions such as shown in Figs. 1 and 2.

I claim:

1. In car construction, the combination with coöperating body and truck bolsters, of locking means encircling said bolsters, said means being sustained by the body bolster and loosely surrounding the truck bolster to thereby permit relative turning movement between the bolsters.

2. In car construction, the combination with the underframe of the car including a body bolster, and a truck having portions thereof extending normally parallel to the body bolster, the body bolster and truck being pivotally connected at their centers; of means for locking the truck and car underframe against accidental separation while at the same time permitting relative vertical movement therebetween both upwardly and downwardly within normal limits, said means including elements extending downwardly from the car underframe and engageable beneath said portions of the truck, said elements being disposed on opposite sides of the bolsters and in line, lengthwise of the car, with the pivotal connection between the body bolster and truck.

3. In car construction, the combination with the underframe of the car and a truck bolster, of means for locking said bolsters against accidental separation, said means being supported from the under-frame of the car and extending loosely on each side of the truck bolster and beneath the latter, said means including elements detachably associated and adapted to be applied and taken off when the bolsters are in operative relation.

4. In car construction, the combination with the under-frame of the car and a truck bolster, of means for locking said bolsters against accidental separation, said means being supported from the under-frame of the car and extending loosely on each side of the truck bolster and beneath the latter, said means including elements extending downwardly at each side of the truck bolster, and a bottom cross key, the latter being detachably connected with the side elements.

5. In car construction, the combination with the under-frame of the car and a truck, of means for locking the truck against accidental separation from the car underframe, said means including two plate-like elements located on opposite sides of the truck bolster at the center thereof, said elements being arranged to have engagement with both the car under-frame and members of the truck upon shifting of the latter abnormally with respect to the car underframe, each of said elements being loosely mounted at one of its ends with respect to the associated part of the car construction to thereby permit normal relative vertical separation between the truck bolster and the car under-frame.

6. In car construction, the combination with the under-frame of a car and a truck including body and truck bolsters pivotally connected at their centers; of means for locking the truck against accidental separation from the car underframe, said means including link-like elements supported from the underframe adjacent the pivotal connection of the bolsters, said link-like elements extending downwardly on each side of the truck bolster, and a horizontally extending element detachably connected to the lower ends of said link-like elements, said horizontally extending element being disposed beneath the truck bolster and permitting relative vertical separation, within predetermined limits, between the body and truck bolsters.

In witness that I claim the foregoing I have hereunto subscribed my name this 28th day of Jan., 1919.

KARL F. NYSTROM.

Witnesses:
T. GORMAN,
A. ARMSTRONG.